United States Patent [19]

Schadt, III

[11] 4,225,665
[45] Sep. 30, 1980

[54] PHOTOGRAPHIC ELEMENT IN WHICH THE ANTISTATIC LAYER IS INTERLINKED IN THE BASE

[75] Inventor: Frank L. Schadt, III, Wilmington, Del.

[73] Assignee: E. I. Du Pont de Nemours and Company, Wilmington, Del.

[21] Appl. No.: 971,561

[22] Filed: Dec. 20, 1978

[51] Int. Cl.² .......................... G03C 1/78; G03C 1/02
[52] U.S. Cl. ................................... 430/529; 430/534; 430/535; 430/537
[58] Field of Search ........................... 96/87 A, 114.1; 428/483; 430/519, 534, 535, 537

[56] References Cited

U.S. PATENT DOCUMENTS

| | | | |
|---|---|---|---|
| 2,717,834 | 9/1955 | Saner | 96/87 A |
| 2,725,297 | 11/1955 | Morey | 96/87 A |
| 3,515,648 | 6/1970 | Chio et al. | 204/2 |
| 3,681,070 | 8/1972 | Timmermart et al. | 96/87 A |
| 3,769,020 | 10/1973 | Verburg | 96/85 |
| 3,791,831 | 2/1974 | Von Bonin et al. | 96/87 A |
| 3,833,457 | 9/1974 | Misumi et al. | 260/79.3 |
| 4,011,080 | 3/1977 | McCabe | 96/87 A |
| 4,018,951 | 4/1977 | Gross | 427/401 |

*Primary Examiner*—Jack P. Brammer

[57] ABSTRACT

An antistatic composition for photographic films which can withstand wet processing is formed by reacting (1) a hydrophobic polymer containing carboxyl groups, (2) a water-soluble copolymer of the sodium salt of styrene sulfonic acid and a carboxyl-containing monomer and (3) carboxylic groups on the film surface to be protected, with (4) a water-soluble polyfunctional aziridine crosslinking agent.

16 Claims, No Drawings

PHOTOGRAPHIC ELEMENT IN WHICH THE ANTISTATIC LAYER IS INTERLINKED IN THE BASE

DESCRIPTION

Technical Field

This invention relates to the field of antistatic compositions suitable for polymeric materials, and in particular to permanent surface layers for photographic elements and films.

Background Art

Due to their high dielectric constant it is a common characteristic of many polymeric articles to build up static charges when moving in contact with surfaces of similarly high dielectric constant. Films, sheets, and rolls used as elements and supports for photographic applications are required to undergo increased relative motion as a result of automation and higher speed production techniques. While static discharge has been a continuing problem with such insulating structures, the problems associated with photographic films are amplified because highly sensitive recording media (e.g., silver halide emulsions) are coated on the supports. In fact, very high speed photographic emulsions are capable of detecting light generated by static discharge which is not visible to the naked eye or easily detected by simple instrumentation. In addition, where films are used in rolls or reels which must be mechanically wound and unwound and used for duplication, i.e., microfilm or medical recording film used to store and later reproduce information, small dirt particles clinging to the surface due to static attraction will be magnified in enlargements. Thus, because static-related damage may result after, as well as before, the photo-sensitive element has been exposed and developed, it is desirable to provide antistatic protection which survives such processing.

Several methods are known for protecting photographic materials from the adverse effects of static.

Matting agents or particulates, i.e, beads or spheres in photographic coatings, can physically separate the film from the roller or plate. This approach has the disadvantage of creating haze, and the particulates may become dislodged and cause dust and dirt problems, which is unacceptable for high quality film uses.

Hygroscopic materials can prevent static by overcoming the low moisture conditions conductive to static, but have the undesirable effect of causing sheets or films to stick together or stick to other surfaces.

Electroconductive polymers can be incorporated into a layer to provide static protection by preventing the static buildup through electrical conductivity. A common problem with these is that they are not permanent to photographic processing solutions and some are not transparent when coated in admixture with conventional binders.

The present invention is directed to novel electrically conductive compositions and coatings, which adhere to the support and are characterized by being permanent to postexposure photographic processing, as well as being transparent.

BRIEF SUMMARY OF INVENTION

It is an object of this invention to provide a permanent antistatic layer for a polymeric shaped article, and more particularly for a polymeric film to be used as a photographic element. The term "permanent" means that the antistatic layer will retain effective electrical conductivity after the photographic element on which it is coated has been exposed and developed, using an aqueous processing solution at some point in the development process, and especially where machine processing is used which involves elevated solution temperatures and hot air drying.

It is a further object of this invention to provide a transparent hydrophobic antistatic layer which can be readily applied to a support from a water dispersion or solution so as to avoid the environmental hazards and greater expense involved with organic solvent coatings. The term "hydrophobic" when applied to the antistatic layer, or to a relatively nonconducting polymeric constituent therein, means that said layer, or polymer, is not readily dissolved in, or swollen by, water.

It is a still further object of this invention to provide a clear and permanent antistatic layer which can be applied during the process of manufacture of the polyester support and thereby provide additional economy and convenience.

The objects of this invention are accomplished by a process in which (a) a support, preferably a polymeric shaped article, having available carboxylic groups on the surface thereof, is coated with an aqueous coating composition comprising: (1) a water-soluble, electrically conductive polymer having functionally attached carboxylic groups integral to the polymer or incorporated therein by chemical means such as copolymerization, (2) a hydrophobic polymer containing carboxylic groups, and preferably in the form of a latex, and (3) a polyfunctional aziridine crosslinking agent capable of interlinking the structure; and (b) this coating is dried and cured to yield a water-resistant electrically conductive antistatic layer. On a weight ratio basis, (1) may range from 25 to 85 provided that the antistatic monomer unit in the case of a copolymer is present in an amount greater than or equal to 15 parts on a weight basis, (2) may range from 15 to 75, and (3) from 2 to 40, it being understood that not every possible combination within this range will necessarily give the optimum is antistatic permanence.

The preferred embodiment of the present invention is a photographic element, i.e. one which is used in photography, and it comprises a polyethylene terephthalate support having coated on one side at least one photosensitive silver halide or photopolymer layer, and coated on the other side an antistatic layer comprising the reaction product of (1) a copolymer of the sodium salt of styrene sulfonic acid and maleic acid, (2) a hydrophobic polymer composed of a latex of a tetrapolymer of major amounts of butyl methacrylate and styrene, and minor amounts of butyl acrylate and methacrylic acid, and (3) a polyfunctional aziridine crosslinking agent, said antistatic layer being transparent.

DETAILED DESCRIPTION OF THE Invention

As used in this specification "latex" is intended to mean an aqueous surfactant-stabilized dispersion of solid polymer particles. A polyester support may also be identified by the term "base".

Particularly preferred for (1) is a copolymer of the sodium salt of styrene sulfonic acid with maleic acid in a 3:1 mole ratio, while (2) is a multicomponent anionic copolymer of methacrylic acid and one or more monomers of the group consisting of alkyl acrylates, styrene, acrylonitrile, and alkyl methacrylates, and wherein the suspending surfactant, if required, is also anionic or nonionic; and (3) is a polyfunctional aziridine capable of forming a three-dimensional structure interlinking the support with both the electrically conductive polymer and the hydrophobic polymer. Prior to being applied to the surface to be protected, the polyfunctional aziridine crosslinking agent and the electrically conductive copolymer of the sodium salt of styrene sulfonic acid and maleic acid are dissolved in the solution or dispersion of the hydrophobic polymer. Addition of the polyfunctional aziridine may be delayed until shortly before coating on a support, since some reaction can occur in the aqueous composition, particularly if held for many hours.

After this composition is coated on the support, the critical crosslinking occurs during the drying and curing of the layer, thereby transforming this composition into its useful form as a permanent antistatic layer which is both water resistant and transparent. Air temperatures of from 40° C. to 200° C. are useful for the drying-curing step, while the preferred range is 90° C. to 160° C.

It is preferable to apply, and dry-cure, the antistatic layer during the manufacture of the polyester support as taught by Alles in U.S. pat. No. 2,779,684, and to apply a resin subbing layer such as the mixed-polymer subbing compositions of vinylidene chloride-itaconic acid, taught by Rawlins in U.S. Pat. No. 3,567,452, prior to the application of the antistatic layer. When polyethylene terephthalate is manufactured for use as a photographic support, the polymer is cast as a film, the mixed polymer subbing composition of Rawlins is applied and the structure is then biaxially stretched, followed by application of a gelatin subbing layer. Upon completion of stretching and the application of subbing compositions, it is necessary to remove strain and tension in the base by a heat treatment comparable to the annealing of glass. Air temperatures of from 100° C. to 160° C. are typically used for this heat treatment, which is referred to as the post-stretch heat relax. If desired, one of the gelatin subbing layers could be replaced by the formulation of the present invention and thus, the facilities and heat treatment involved in base manufacturing, when used for the application and drying-curing of the present invention, serve a dual purpose and result in an increase in productivity and economy.

In a preferred embodiment the electrically conductive, antistatic polymer comprises a copolymer of the sodium salt of styrene sulfonic acid and maleic acid in a 3:1 molar ratio having a molecular weight of about 5000. The low molecular weight is desirable to insure water solubility and to obtain transparent and haze-free coatings. The higher amount of the electrically conductive sodium salt of styrene sulfonic acid in relation to the carboxylate unit serves to balance the requirement for antistatic protection with sufficient capability of the copolymer to become permanently attached to the hydrophobic polymer and/or other antistatic polymers, as well as the support, via these carboxylic groups.

Hydrophobic polymers used in the present invention include those with molecular weights ranging from 20,000 to over 1,000,000. One group of high molecular weight polymers comprises copolymers of 40 to 45% styrene, 40 to 45% butyl methacrylate, 0 to 10% butyl acrylate, and 4 to 18% methacrylic acid, prepared by emulsion polymerization in the presence of a noncationic surfactant. Another group of high molecular weight polymers comprises copolymers of 40 to 45% butyl methacrylate, 40 to 45% acrylonitrile, and 10 to 20% methacrylic acid, emulsion-polymerized in the presence of a noncationic surfactant. One group of lower molecular weight polymers comprises copolymers of 36 to 90% methyl methacrylate, 5 to 50% ethyl acrylate, and 5 to 16% methacrylic acid, prepared by emulsion polymerization in the presence of sodium lauryl sulfonate, which is an anionic surfactant.

Other anionic surfactants suitable for preparing and suspending the hydrophobic latex of the present invention in addition to sodium lauryl sulfonate are dioctyl sodium sulfosuccinate, sodium octyl phenyl polyether sulfonate, and other sodium alkyl aryl polyether sulfonates. Since it is usual practice to use a large quantity of surfactant during emulsion polymerization of commercial latex dispersions, it is usually unnecessary to add additional surfactant.

The preferred polyfunctional aziridine crosslinking agent is pentaerythritol-tri-[β-(N-aziridinyl)propionate]:

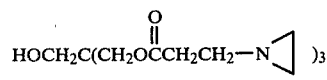

It is a soluble clear, amber liquid having an aziridine content of 6.76 milliequivalents per gram and an aziridine functionality of 2.76. Other polyfunctional aziridine hardeners can also be used such as trimethylol propane tri-[β-(N-aziridinyl)-propionate]:

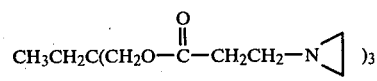

and trimethylol propane-tri-[β-(N-(methylaziridinyl)) propionate]

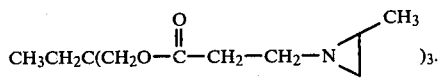

Other polyfunctional aziridines could be employed as long as at least two crosslinking groups are contained in each molecule.

The aqueous coating composition may be applied to any suitable photographic support, but the preferred support is polyethylene terephthalate which has been sub-coated with a layer of resin, or layers of resin and gelatin. In order to achieve sufficient conductivity and desired physical properties, the total coverage of the electrically conductive copolymer and hydrophobic polymer is crosslinked together and to the carboxyl groups of the support can range from 5 to 100 mg/dm². The coating weight or coverage is based on the dry weight of the composition. Too low a coverage does not provide adequate, permanent, antistatic protection. A coating of approximately 3 mg/dm² gave incomplete coverage of the support. Applying excessive amounts cannot be economically justified, since little additional benefit is derived.

A backing layer is the preferred location for the hydrophobic antistatic composition of the present invention when used for photographic films or rolls. However, other specific applications may require that antistatic protection be provided above or beneath a photosensitive layer. When used in conjunction with other photosensitive and auxiliary layers it may be necessary to have intermediate layers to provide compatibility and provide sufficient adhesion to adjacent layers. Thus, while the antistatic composition of the present invention can be applied satisfactorily to a resin or gelatin subbing layer on the surface of the support, it may be necessary to coat a gelatin layer over the antistatic layer in preparation for the application of a gelatino-silver halide emulsion coating.

The photosensitive and/or radiation sensitive layers useful with the present invention may be any which are well-known for imaging and reproduction in fields such as graphic arts, printing, medical, and information systems. Photopolymer, diazo, vesicular image-forming compositions and other systems may be used in addition to silver halide. Photographic silver halide emulsions may be of varied content and be negative and/or positive working. The response of the silver halide may be enhanced and stabilized by such chemical agents as boranes, amines, polyethylene oxides, tetraazaindenes, benzotriazole, alkali halides, phenyl mercaptotetrazole, and gold, mercury and sulfur compounds. In addition dyes, development modifiers, covering power polymers, surfactants, latices, hardeners and other addenda known in the photographic art may be employed with the photographic silver halide emulsion.

It has been found that, in addition to obtaining clear coatings which retain both their clarity and antistatic property after postexposure photographic processing, the preferred antistatic polymer of the present invention exhibits a plasticizing action on the hydrophobic polymer. This surprising result was revealed when coatings were being made to vary the ratios between antistatic polymer and hydrophobic polymer. When less than 20 parts by weight of the preferred antistatic polymer was included in the aqueous coating composition the resulting layer exhibited cracks after drying and curing. This problem could be eliminated by increasing the temperature at which drying and curing took place and adding a plasticizing agent, ethyl cellosolve.

It has also been discovered that, while the coatings of the present invention are both transparent and permanent, haze, if present, may be reduced by the addition of sodium sulfate. A similar type of haze reduction was the subject of Garrett et al in U.S. Pat. No. 3,272,631.

When from 2 to 5% by weight of colloidal silicon dioxide was added to the composition for the purpose of improving static properties as taught by Mackey et al, U.S. Pat. No. 3,053,662, it was found that the coatings retained clarity but that a granular appearance resulted.

These compositions coat well on resin-subbed polyester base, and give slightly lower resistivities than when coated on a support which has been coated previously with a gelatin stratum.

The antistatic layer of the present invention may also contain addenda which do no degrade the antistatic properties. Typical are matting agents, plasticizers, lubricants, surfactants, dyes, and haze reducing agents.

While it is obvious that, when the composition of the present invention is used on an opaque support, it is not necessary to obtain a haze-free coating, the preferred mode of the invention results in more universally useful clear coatings. In this regard it is significant that the antistatic polymer with carboxyl groups, the hydrophobic polymer, and the stabilizing surfactant, if needed, are all of the same charge type, anionic or nonionic (surfactant), to allow crosslinking without the incompatibility which could occur if cationic and anionic elements were mixed together.

Limitations to the operative range of the present invention have been determined by experiment. Increasing the level of the antistatic polymer to 50 to 75 weight percent significantly lowers the resistivity, but also introduces increasing haziness with some hydrophobic polymers. Methyl methacrylate copolymers gave the highest increase in haziness, while styrene copolymers gave the clearest coatings. When dryer air temperature was decreased from 125° C. to 60° C. to allow slower latex coalescence, the antistatic protection was slightly poorer as measured by both static and dynamic testing. Adjusting the the pH of coating solutions with sodium hydroxide instead of ammonium hydroxide resulted in hazier coatings. The aqueous coating solution containing the antistatic copolymer, hydrophobic polymer, and polyfunctional aziridine crosslinking agent has a finite useful life. After being held for three days a coating made from this solution failed to give permanent antistatic protection compared with a fresh coating made from the same solution. It is believed that the solution slowly loses its crosslinking property due to hydrolysis or homopolymerization of the polyfunctional aziridine. The use of chrome alum as a gelatin hardening agent in a freshly coated gelatin subbing layer over which the antistatic formulation was coated caused an increase in haziness for the antistatic layer.

Details of the measurements of surface resistivities for photographic films may be found in Nadeau et al, U.S. Pat. No. 2,801,191. Amey et al, American Society for Testing Materials Proceedings, Vol. 49, 1079–1091 (1949) provide the details for the surface resistivity measurements of this application. While surface resistivity was used extensively in evaluating the present invention, a dynamic measure was also made by electronically counting the static discharges as film samples were transported through an apparatus simulating a microfilm camera containing rollers known for high levels of static generation. Both static and dynamic tests were run under controlled humidity conditions, since otherwise the test results would not be comparable due to the variation in static propensity with changes in humidity.

Specific viscosity of antistatic polymers was measured at room temperature using a 1% polymer solution in distilled water adjusted to pH 9.0 with aqueous ammonia and using a Cannon-Fenske viscometer.

Determination of the amount of antistatic composition which has been applied to the base or support may be carried out by a simple gravimetric method. A dry sample of known area is weighed and the antistatic layer is then removed by rubbing with a household bleach solution of sodium hypochlorite. After washing with water and acetone the sample is dried and weighed. The weight loss divided by the sample area gives the coating weight per unit area. It is also possible to determine coating weights by measuring the amount of coating solution consumed for a given area of coated surface. Knowing the amount of solid in the coating solution it is possible to divide this weight by the area coated and obtain the approximate coating weight per unit area. One other method which is useful only in terms of calibration, is to add a dye to the coating solution in order to obtain a relationship between optical density and coating weight. Since optical density is a quick measurement and can be run even with a wet sample, it is possible to quickly adjust parameters to obtain the optical density corresponding to the desired coating weight.

Once conditions are correct, coating solutions of the same percent solids can be used without the dye addition to give the desired transparent coatings of the present invention.

The permanent nature of the antistatic layer of the present invention makes it particularly beneficial for use with photographic films which are coated and stored in roll form since adverse effects from diffusion of unbound components out of the antistatic layer into the emulsion layer can be reduced substantially or eliminated. Sensitometric tests show no deleterious results when films made by the present invention are compared with those having only a subbing and/or gelatin coating.

For the preferred antistatic copolymer, the ratio of sodium salt of styrene sulfonic acid to maleic acid is 3:1 (molar), or on a weight ratio basis, 79:21. Other antistatic copolymer weight ratios of from 95:5 to 2:3 will give the desired permanent antistatic protection of the present invention, provided that the antistatic monomer unit is present in an amount equal to or greater than 15 parts on a weight ratio basis, in reference to the limits set forth in the "Brief Summary of Invention". Thus, while increasing the portion of the copolymer containing the ionic electrically conductive sulfonates will lower the amount needed to be added to the aqueous coating composition, the availability of crosslinking sites is corresponding reduced. Conversely when the carboxylic-containing component is increased at expense of the antistatic portion, more carboxylic crosslinking sites are provided than are required for the protection gained. As a result of experimental work, it has been determined that the desired permanence, clarity, and antistatic performance will be achieved when the copolymer has a predominance of the sodium salt of styrene sulfonic acid over maleic acid.

The following examples serve to illustrate the practice of the invention. Example 1 contains an advantageous mode for practicing the invention and additionally contains a comparative example showing the improvement provided by the present invention.

EXAMPLE 1

A hydrophobic polymer of molecular weight above one million was prepared by standard emulsion polymerization using a noncationic surfactant. The polymer was a copolymer of 43% styrene, 45% butyl methacrylate, 4% butyl acrylate, and 8% methacrylic acid. The latex was diluted to 10.7% solids with distilled water and the pH was adjusted to 8.6 using concentrated ammonium hydroxide. A quantity of 3186 g of this latex was stirred while 3993 g of a 12.7% solids water solution of a copolymer of the sodium salt of styrene sulfonic acid and maleic acid in a 3:1 ratio was added at pH 8.6. The pH of the mixture was adjusted to 8.6, and the solution was heated to 35° C. Prior to coating this polymer mixture on a support, 127 g of pentaerythritol-tri-[β-(N-aziridinyl)-propionate] was added and stirred for 15 min., and the pH was again adjusted to 8.6. The composition was then filtered to remove any dirt. This composition was 13% solids and contained a weight ratio of 60/40/15 for the antistatic copolymer/hydrophobic polymer/polyfunctional aziridine. The coating solution (35° C.) was applied onto a polyethylene terephthalate support surface after the application of a resin coating composed of a 12% solids dispersion, containing saponin and sodium lauryl sulfonate as dispersing agents, of 75 parts per dry weight of a terpolymer of 90% vinylidene chloride, 8% methyl acrylate, and 2% itaconic acid to which 25 parts per dry weight of ethyl acrylate had been added and then polymerized, using sodium metabisulfite and ammonium persulfate.

These were coated at a speed of 33 m/min. using a roll-fitting coating pan and an air knife. The coated support was dried at 110° C. prior to entering the heat relax zone where a slight tension was maintained in the longitudinal or machine direction while the film was exposed to air temperatures of 102° C. Samples taken of the experimental antistatic coating were clear and are further characterized in Table 1.

An anionic hydrophobic polymer of specific viscosity 0.30 ($CHCl_3$) and molecular weight 80,000 was prepared by standard emulsion polymerization using sodium lauryl sulfonate surfactant. The polymer is a copolymer of 78% methyl methacrylate, 17% ethyl acrylate, and 5% methacrylic acid. The latex was diluted to a solids content of 11.2% and adjusted to pH 9. To this was added, with stirring, a 13.3% solids solution of a copolymer of the sodium salt of styrene sulfonic acid and maleic acid in 3:1 mole ratio at pH 8.9. The mixture was adjusted to pH 9.0 and heated to 35° C. Pentaerythritol-tri-[β-(N-aziridinyl)-propioniate] was added to give a 13% solids content for the coating solution, which was adjusted to pH 9.0 and contained a 55/45/10 weight ratio of antistatic polymer/hydrophobic polymer/polyfunctional aziridine. This coating solution (35° C.) was filtered and applied onto a polyethylene terephthalate support which has been resin-coated with a 12% solids dispersion, using saponin and sodium lauryl sulfonate as dispersing agents, of 75 parts per dry weight of a terpolymer of 90% vinylidene chloride, 8% methyl acrylate, and 2% itaconic acid to which 25 parts per dry weight of ethyl acrylate had been added and then polymerized by sodium metabisulfite and ammonium persulfate.

The coatings were sequentially applied at a speed of 23 m/min. using a roll-fitted coating pan and an air knife. The coated base was transported to the dryer and then to the heat relax zone where a slight tension was maintained in the longitudinal or machine direction while exposed to air temperatures of 102° C. to 110° C. Samples taken of the antistatic coating were clear and are further characterized in Table 1.

COMPARATIVE EXAMPLES

For comparison, doctor blade coating and subsequent heat treatment was performed on formulations which contained the same 60/40/15 and 55/45/10 weight ratios of antistatic polymer/hydrophobic polymer/polyfunctional aziridine, but the preferred antistatic copolymer (the sodium salt of styrene sulfonic acid and maleic acid in a 3:1 molar ratio) was replaced by the sodium salt of the homopolymer of styrene sulfonic acid. The latter is well-known in the art, and described in U.S. Pat. No. 3,681,070. These coatings contained all other elements of the present invention except for available carboxylic groups on the antistatic polymer; they did not give clear coatings and did not survive photographic processing as demonstrated in Table 1.

Table 1

Weight
Ratio:
Antistatic
polymer/
hydrophobic
polymer/

Table 1-continued

| Coating No. | Antistatic Polymer | Hydrophobic polymer | polyfunctional aziridine |
|---|---|---|---|
| A | 3:1 sodium salt of styrene sulfonic acid with maleic acid | 43% styrene 45% butylmethacrylate 4% butyl acrylate 8% methacrylic acid | 60/40/15 |
| B | 3:1 sodium salt of styrene sulfonic acid with maleic acid | 78% methyl methacrylate 17% ethyl acrylate 5% methacrylic acid | 55/45/10 |
| C | sodium salt polystyrene sulfonate | 43% styrene 45% butylmethacrylate 4% butyl acrylate 8% methacrylic acid | 60/40/15 |
| D | sodium salt polystyrene sulfonate | 78% methyl methacrylate 17% ethyl acrylate 5% methacrylic acid | 55/45/10 |

| Coating No. | Resistivities 23-28% RH | | Final Appear. |
|---|---|---|---|
| | Initial | After Auto Proc. | |
| A | $3.8 \times 10^9$ | $4.5 \times 10^{10}$ | Clear |
| B | $9.3 \times 10^9$ | $6.9 \times 10^{10}$ | Clear |
| C | $3.6 \times 10^8$ | $9.3 \times 10^{14}$* | Hazy |
| D | $3.4 \times 10^8$ | $1.7 \times 10^{16}$* | Hazy |

*Dry films cling to the surface of the automatic processor due to static attraction, which is unacceptable performance.

Thus as can be seen from Table 1, the use of prior art antistatic polymer does not produce a clear and permanent antistatic coating which resists the chemical reagents involved in photographic processing in an emulsion.

A commercial iodobromide microfilm emulsion was coated on a sample of base employing as the antistatic composition that of coating No. A of Table 1. The emulsion was then overcoated with a protective antiabrasion layer. The film structure so produced was as follows:
1. Overcoat
2. Emulsion
3. Gelatin Subcoat
4. Resin Subcoat
5. Polyethylene terephthalate clear base
6. Resin Subcoat
7. Antistatic composition.

This was compared with the same emulsion coated on base having a gelatin antistatic backing. Identical sensitometric properties were obtained in standard quality control tests of fresh and normal aging samples stored both in sheet and roll form. The microfilm so prepared retains the static protection of the present invention after being processed by either manual or automatic processing techniques. As a result, when used in microfilm printers, there will be a greatly reduced tendency to pick up dirt on the microfilm surface due to static attraction, since localized concentration of charge will be reduced by the permanent electrically conductive layer of the present invention.

EXAMPLE 2

A mixture of (1) the same 3:1 ratio antistatic polymer, (2) a hydrophobic polymer latex similar to that in Example 1 except with a ratio of 66/29/5 methylmethacrylate/ethyl acrylate/methacrylic acid, and (3) the aziridine crosslinking agent used in Example 1, were combined in the weight ratio 38/62/5. Different concentrations were used to vary the coating weight for doctor blade application to a gelatin-subbed polyester support. The pH was adjusted to 9.0 in each case. Samples were dried for 3 min. at 60° C. and then baked in an oven for 90 secs. at 130° to 140° C. Table 2 indicates that minimum limits exist for coating weight.

Table 2

| Coating Solution % Solids | Approximate Ctg. Wt. Mg/dm$^2$ | Initial Appearance |
|---|---|---|
| 5.1 | 13 | Clear |
| 4.1 | 10 | Clear |
| 2.1 | 5 | Clear |
| 1.1 | 3 | Clear |

| Coating Solution % Solids | Final Appearance | Resistivities 21 to 24% RH | |
|---|---|---|---|
| | | Initial | After Tray Proc. |
| 5.1 | Clear | $4.8 \times 10^{10}$ | $6.6 \times 10^{11}$ |
| 4.1 | Clear | $1.2 \times 10^{10}$ | $3.5 \times 10^{11}$ |
| 2.1 | Clear | $2.1 \times 10^{11}$ | $6.1 \times 10^{12}$ |
| 1.1 | Not Run | $3.8 \times 10^{13}$ | Not Run |

Since the 3 mg/dm$^2$ coating was obviously less conductive than the others, it was not tested further in connection with providing static protection for high quality microfilm. This does not mean that this coating might not be suitable to provide static protection for some other applications.

EXAMPLE 3

A copolymer of the sodium salt of styrene sulfonic acid and maleic acid prepared in a molar ratio of 1:1 was compared with the 3:1 copolymer of Example 2 using the same hydrophobic polymer latex. The aqueous coating solutions were adjusted to pH 9.0 using aqueous ammonia, diluted to 5% solids content, and coated with a 2 mil doctor blade on gel-subbed base to give coatings of about 13 mg/dm$^2$. These coatings were dried for 2 min. at 60° C. and then baked in an oven for 90 seconds at 140° C. while held in a frame under tension. Table 3 gives comparative results.

Table 3

| Ratio Antistatic Copolymer | Wt. Ratio Antistatic copolymer/hydrophobic polymer/polyfunctional aziridine | Resistivities RH 21-24% | | Final Film Appearance |
|---|---|---|---|---|
| | | Initial | After Tray Proc. | |
| 3:1 | 38/62/5 | $6.9 \times 10^{10}$ | $9.9 \times 10^{11}$ | Clear |
| 3:1 | 56/44/5 | $5.4 \times 10^{10}$ | $1.6 \times 10^{11}$ | Sl. Hazy |
| 3:1 | 27/73/5 | $4.6 \times 10^{12}$ | $5.7 \times 10^{12}$ | Clear |

EXAMPLE 4

In addition to static resistivity measurements, samples were also dynamically tested by transporting them through an apparatus containing rollers from a commercial DatagraphiX microfilm camera. Electronic sensors were positioned in this apparatus to detect static discharges during the transport operation and record these as pulses. Table 4 shows a comparison obtained under extreme conditions of very low humidity and high instrument sensitivity.

Table 4

| Antistatic Polymer | Hydrophobic polymer | Wt. Ratio Antistatic polymer/hydrophobic polymer/polyfunctional aziridine | Pulses at 11-12% RH, 50 Passes Through Apparatus |
|---|---|---|---|
| None | None | (Gelatin Subbed Base) | 239 |
| Sodium polystyrene sulfonate (control) | None | (Prior art antistatic backing) | 8 |
| 3:1 sodium salt of styrene sulfonic acid/maleic acid | 66% methyl methacrylate 29% ethyl acrylate 5% methacrylic acid | 38/62/5 | 169 |
| 3:1 sodium salt of styrene sulfonic acid/maleic acid | 43% styrene 45% butyl methacrylate 4% butyl acrylate 8% methacrylic acid | 60/40/15 | 0 |

As indicated, sodium polystyrene sulfonate reduces static discharge during film transport. In agreement with Examples 3 and 7, the higher the amount of antistatic polymer the better the protection. While the use of sodium polystyrene sulfonate as an antistatic backing composition dramatically reduces static pulses, the control example of Table 4 will not survive photographic processing as will the indicated compositions of the present invention. The values obtained in these dynamic tests correlate with the static resistivity tests and reveal that films which have good static protection give superior results under both static and dynamic conditions.

EXAMPLE 5

A copolymer prepared by polymerizing 95% by weight of the sodium salt of styrene sulfonic acid and 5% by weight methacrylic acid was tested in combination with hydrophobic polymer latex compositions which contained methacrylic acid as one component. When tested in comparison to the preferred antistatic polymer of Example 1, it was determined that permanence to automatic photographic processing could be achieved even with a limited quantity of carboxylic groups present in the antistatic copolymer; however, the preferred 3:1 antistatic copolymer gave much clearer initial and processed coatings. The compositions tested and the results obtained are given in Table 5. Processing was done by machine.

Table 5

| Antistatic copolymer | Hydrophobic polymer | Wt. Ratio Antistatic copolymer/hydrophobic polymer/polyfunctional aziridine | Resistivities RH 22-25% Initial | Resistivities RH 22-25% Final | Final Appearance |
|---|---|---|---|---|---|
| 3:1 sodium salt of styrene sulfonic acid/maleic acid | 43% styrene 45% butyl methacrylate 4% butyl acrylate 8% methacrylic acid | 32/68/7 | $8.2 \times 10^{10}$ | $1.3 \times 10^{13}$ | Clear |
| 3:1 sodium salt of styrene sulfonic acid/maleic acid | 45% acrylonitrile 41% butyl methacrylate 14% methacrylic acid | 32/68/7 | $1.0 \times 10^{11}$ | $2.0 \times 10^{14}$ | Slightly Hazy |
| 95:5 sodium salt of | 43% styrene 45% butyl | 31/69/7 | $1.3 \times 10^{10}$ | $1.2 \times 10^{12}$ | Cloudy |

Table 5-continued

| Antistatic copolymer | Hydrophobic polymer | Wt. Ratio Antistatic copolymer/hydrophobic polymer/polyfunctional aziridine | Resistivities RH 22-25% Initial | Resistivities RH 22-25% Final | Final Appearance |
|---|---|---|---|---|---|
| styrene sulfonic acid/ methacrylic acid | methacrylate 4% butyl acrylate 8% methacrylic acid | | | | |
| 95:5 sodium salt of styrene sulfonic acid/ methacrylic acid | 45% acrylonitrile 41% butyl methacrylate 14% methacrylic acid | 31/69/7 | $2.1 \times 10^{10}$ | $3.1 \times 10^{11}$ | Cloudy |

EXAMPLE 6

Aqueous compositions were prepared similar to Example 1 and coated on vinylidene chloride-itaconic acid subbed polyester base to give over 10 mg/dm² coating weight. An alternate antistatic copolymer was compared with the preferred additive. The hydrophobic latex polymer composition was 43% styrene, 45% butyl methacrylate, 4% butyl acrylate, and 8% methacrylic acid. Results are given in Table 6.

Table 6

| Antistatic copolymer | Antistatic Copolymer Spec. Visc. | Wt.Ratio Antistatic copolymer/ hydrophobic polymer/ polyfunctional aziridine | Resistivities RH 22-25% Initial | Resistivities RH 22-25% After Proc. | Final Film Appearance |
|---|---|---|---|---|---|
| 3:1 (molar) sodium salt of styrene sulfonic acid/maleic acid | 0.16 | 32/68/7 | $8.2 \times 10^{10}$ | $1.3 \times 10^{13}$ | Clear |
| 3:2 (weight) sodium salt of styrene sulfonic acid/ acrylic acid | 3.7 | 48/52/7 | $8.1 \times 10^{11}$ | $6.3 \times 10^{11}$ | Hazy |

These results show that a higher viscosity (therefore higher molecular weight) copolymer of sodium salt of styrene sulfonic acid with acrylic acid did function to give the permanent antistatic protection, but at a sacrifice of clarity. This also shows that other carboxylate groups may be attached to the antistatic polymer to yield the desired cross-linking of the present invention.

EXAMPLE 7

Aqueous compositions were prepared using the preferred 3:1 antistatic copolymer of Example 1 and coated (35° C.) on the base of Example 6 to give over 10 mg/dm² coating weight, except that both the hydrophobic latex polymer and its ratio to the antistatic 3:1 copolymer were varied. They were dried at 90° C. for 1½ to 2 min. and cured at 135° C. for 2 min. Table 7 gives a comparison of results obtained.

Table 7

| Hydrophobic polymer | Wt. Ratio Antistatic copolymer/ hydrophobic polymer/ polyfunctional aziridine | Initial Appearance | Resist. RH 22-24% | Appear. After Process. |
|---|---|---|---|---|
| As in coating No. B of Table 1 | 50/50/10 | Clear | $1.6 \times 10^{10}$ | Clear |
| Same | 55/45/10 | Clear | $5.7 \times 10^9$ | Clear |
| Same | 60/40/10 | Sl. Hazy Sl.Hazier than | $3.9 \times 10^9$ | Sl. Hazy Sl.Hazier than |
| Same | 75/25/10 | 60/40/10 | $1.8 \times 10^9$ | 60/40/10 |
| As in coating No. A of Table 1 | 50/50/10 | Clear | $2.6 \times 10^{10}$ | V.Sl. Hazy |
| Same | 60/40/10 | Clear | $2.7 \times 10^9$ | Clear |
| Same | 65/35/10 | Clear | $1.9 \times 10^9$ | Clear |

This example shows that with the preferred 3:1 antistatic copolymer the haze increases faster as amount of the copolymer is increased in the methyl methacrylate latex coatings. However, all those coatings serve to illustrate satisfactory practice of the present invention and show that variations in composition may be made to adjust the formulation for best performance.

EXAMPLE 8

The preferred 3:1 copolymer of sodium salt of styrene sulfonic acid with maleic acid was mixed with a sodium lauryl sulfonate/latex dispersion of the hydrophobic polymer comprising 66% methyl methacrylate, 29% ethyl acrylate and 5% methacrylic acid. The pH was adjusted to 9 using a 5% aqueous ammonia. The antistatic/hydrophobic polymer ratios were varied, but the polyfunctional aziridine content was kept at a constant 5 parts by weight. Samples were coated as in Example 3 and dried at 60° C. for 3 min. or 99° C. for 2 min. and then cured at 130° C. for 1½ min. Table 8 gives results.

Table 8

| Wt. Ration 3:1 antistatic copolymer/hydrophobic polymer/polyfunctional aziridine | Original Coating Quality | | Resistivity RH 22–24% | | Final App. After Tray Processing |
|---|---|---|---|---|---|
| | 60° C. | 99° C. | 60° C. | 99° C. | |
| 19/81/5 | Cracks | Cracks | 4.7×10$^{12}$ | — | Clear |
| 29/71/5 | — | No Cracks | — | 1.1×10$^{11}$ | Clear |
| 38/62/5 | No Cracks | No Cracks | 4.8×10$^{10}$ | — | Clear |

It is evident that the cracking which occurred when the first composition was dried at 60° C. could not be eliminated solely by drying at 99° C.

EXAMPLE 9

When up to 5% by weight of ethyl cellosolve (a well-known plasticizer) was added to the 19/81/5 composition of Example 8, which had exhibited cracks in the coatings, it was observed that the cracking was eliminated (99° C. drying) and clarity was preserved.

EXAMPLE 10

The 60/40/15 composition of Example 1 was coated under high speed coating conditions (63 m/min.); the resultant coating exhibited a very slight haze. But when 3 to 6% by weight of sodium sulfate was added to the composition a coating was obtained with lower haze.

EXAMPLE 11

Coatings were made similar to those in Example 2 with the exception that a gelatin subbing layer had not been applied over the resin subbing layer on the polyethylene terephthalate support and the coating weight was maintained above 10 mg/dm$^2$. Evaluation of these coatings in comparison to the coatings of Example 2 showed that similar good adhesion was obtained with only the resin sub, and the antistatic protection survived tray processing, remaining clear and nonhazy. Samples with the antistatic layer had scratch resistance only slightly worse than the support with only resin and gelatin subbing. The scratch test used an ASTM standard PH 1.37-1963: Determining the Scratch Resistance of Processed Photographic Film. It was also found that scratch resistance could be improved slightly if the methacrylate content of the hydrophobic polymer was increased to 78% methyl methacrylate, 17% ethyl acrylate, and 5% methacrylic acid, the latex used in Example 1 for coating B.

EXAMPLE 12

The same styrene hydrophobic polymer dispersion was used as in Example 1 except that the pH was adjusted to 7.6 before and after the addition of the preferred 3:1 copolymer of sodium salt of styrene sulfonic acid and maleic acid. After the addition of the pentaerythritol-tri-[β-(N-aziridinyl)-propionate] the pH was measured as 8.5, and adjusted slightly to 8.25 with 1.5 N H$_2$SO$_4$. The aqueous composition was filtered and then coated as in Example 1, except that the coating speed was 63 m/min. and the dryer temperature was 104° C. while the heat relax air temperature was 140° C. Whereas a previous coating at this higher speed had poorer coating quality, it was found that maintaining a lower pH prior to the addition of the polyfunctional aziridine hardener eliminated the fineline defects and gave clear, nonhazy film which demonstrated the permanent antistatic characteristics of previous examples.

EXAMPLE 13

Resin-subbed polyethylene terephthalate base was coated with a composition similar to that of Example 2 (35/65/7) and then dried at 110° C. and cured at 139° C. A photopolymer composition prepared as taught in Belgium Pat. No. 848409 was then extrusion coated on this base and also on another sample of the same polyester support which had been coated with polysilicic acid to form the antistatic backing. This serves as a control. Rolls having these coatings were then slit and chopped into sheets in a finishing operation carried out at 50 to 60% RH. The sample having the polysilicic acid coating, as opposed to the antistatic backing of the present invention, was observed to pick up dirt by static attraction associated with static discharge, resulting in nonimaged pinhole areas on the final processed films. No such static defects were observed with the other sample, which embodied the present invention. All other physical and sensitometric properties were equivalent. Measured at 22 to 25% RH the film of the present invention had a surface resistivity of 8.2×10$^9$ before processing and 1.0×10$^{10}$ afterwards. Values for the control photopolymer film were 3.3·.10$^{14}$ before processing and 3.1×10$^{15}$ afterwards. These results show that the present invention is not limited to providing antistatic coatings for silver halide photographic films but can also be used to provide antistatic coatings to other types of photosensitive compositions which are susceptible to static damage.

EXAMPLE 14

The formulation of Example 1 using the same 3:1 ratio antistatic copolymer, the same styrene hydrophobic polymer latex, and the same polyfunctional aziridine crosslinking agent was coated on both resin-subbed and unsubbed flame-treated polyethylene terephthalate base (direct exposure to propane gas flame at 61 m/min). The coating was then dried and cured at 106° C. for 2 min. Both coatings were clear and of good quality, and had good antistatic properties. Table 9 contains comparative results obtained from these tests.

Table 9

| Substrate Treatment | Resistivities Initial | 26–27% RH after Auto. Processing | Final Appear. |
|---|---|---|---|
| Resin subbed | 5.0 × 10$^8$ | 3.6 × 10$^{10}$ | Clear |

Table 9-continued

| Substrate Treatment | Resistivities Initial | 26–27% RH after Auto. Processing | Final Appear. |
|---|---|---|---|
| Flame-treated, unsubbed | $4.8 \times 10^8$ | $2.3 \times 10^{10}$ | Clear |

The flame-treated base gives resistivity results equivalent to resin-subbed base.

EXAMPLE 15

The coating composition of Example 2 was coated on gel-subbed base and then dried and cured at 40° to 48° C. to give a clear coating. Longer times are required to produce the finished permanent antistatic composition than other examples since the evaporation of water is slower. However, the result is still satisfactory because the coating demonstrates resistivities comparable to the 10 and 13 mg coating weights of Example 2 both before and after tray processing.

EXAMPLE 16

Higher levels of the polyfunctional aziridine crosslinking agent and its method of addition were investigated. The same 3:1 ratio of antistatic copolymer and styrene hydrophobic polymer latex were used as in Example 1. Table 10 contains results from tests on coatings on resin-subbed base.

Table 10

| Wt. Ratio Antistatic copolymer/ hydrophobic polymer/ polyfunctional aziridine | Amount Added | | Resistivities 26–27% RH | | Final Appear. |
|---|---|---|---|---|---|
| | Prior to Coating | Previous Day | Initial | After Auto Proc. | |
| 60/40/15 | 15 | 0 | $2.4 \times 10^8$ | $1.7 \times 10^{10}$ | Clear |
| 60/40/30 | 30 | 0 | $3.0 \times 10^8$ | $6.9 \times 10^9$ | Clear |
| 60/40/25 | 15 | 10 | $4.4 \times 10^8$ | $1.8 \times 10^{11}$ | Clear |

These results show that it is possible to increase the level of aziridine crosslinking agent and to vary the method of addition while still obtaining results which demonstrate satisfactory practice of the present invention. The 60/40/25 formulation in Table 10 represents the best mode of carrying out the invention and the first addition of crosslinker (10 parts) can be added the previous day or as late as four hours before the second addition (15 parts). While the foregoing specification and examples describe employing hydrophobic polymers containing carboxyl groups in the form of a latex, this does not foreclose the possibility of using suitable polymers from this class in the form of aqueous solution as well.

We claim:

1. A photographic element comprising a polymeric shaped article having available carboxyl groups on the surface thereof and which is coated with a permanent antistatic layer consisting essentially of the reaction product of
   (1) a water-soluble, electrically conductive polymer having functionally attached carboxyl groups integral to the polymer,
   (2) a hydrophobic polymer containing carboxyl groups, and
   (3) a polyfunctional aziridine.

2. The photographic element of claim 1 wherein on a weight ratio basis, the proportions of (1) may range from 25 to 85, (2) from 15 to 75, and (3) from 2 to 40.

3. A process for preparing the photographic element of claim 1 which comprises coating a polymeric shaped article having available carboxyl groups on the surface thereof with an aqueous coating composition consisting essentially of (1) a water-soluble, electrically conductive polymer having functionally attached carboxyl groups integral to the polymer, (2) a hydrophobic polymer containing carboxyl groups, and (3) a polyfunctional aziridine; and drying and curing this coating to yield a water-resistant, electrically conductive antistatic layer.

4. The process of claim 3 wherein said antistatic layer is applied to one or both sides of a flametreated polyethylene terephthalate film.

5. The process of claim 3 wherein said antistatic layer is applied to one or both sides of a polyethylene terephthalate film which is subcoated with a resin film, or resin and gelatin films prior to application of the antistatic coating composition.

6. The process of claim 3 wherein the hydrophobic polymer (2) is applied in the form of a latex.

7. A photographic element comprising a polymeric film support, a photosensitive layer on said support, and a permanent antistatic layer coated on at least one surface of said support, said antistatic layer consisting essentially of the reaction product of (1) a water-soluble, electrically conductive copolymer of a salt of styrene sulfonic acid and a monomer having functionally attached carboxyl groups, in a weight ratio of from 95:5 to 2:3, (2) a hydrophobic polymer containing carboxyl groups, and (3) a polyfunctional aziridine, wherein said aziridine interlinks (1) and (2) to form said antistatic layer; and wherein (1) may range from 25 to 85, (2) from 15 to 75, and (3) from 2 to 40, on a weight ratio basis.

8. The photographic element of claim 7 having a photosensitive layer of silver halide or photopolymer coated on said support.

9. The photographic element of claim 7 wherein the support is a polyester film.

10. The photographic element of claim 7 wherein the coating weight of the antistatic layer on the support is from 5–100 mg/dm$^2$.

11. The photographic element of claim 7 wherein the copolymer (1) is a copolymer of the sodium salt of styrene sulfonic acid and the disodium salt of maleic acid.

12. The photographic element of claim 7 wherein the hydrophobic polymer (2) is a multicomponent anionic copolymer of methacrylic acid and one or more monomers of the group consisting of alkyl acrylates, styrene, acrylonitrile, and alkyl methacrylates.

13. The photographic element of claim 12 wherein the hydrophobic polymer (2) is a copolymer of styrene, butyl methacrylate, butyl acrylate, and methacrylic acid.

14. The photographic element of claim 7 wherein the antistatic layer serves as the back, sub, or overcoating for a silver halide or photopolymer film.

15. A photographic element comprising a polyethylene terephthalate support having coated on one side a photosensitive silver halide or photopolymer layer, and coated on the other side a permanent antistatic layer consisting essentially of the reaction product of (1) a copolymer of the sodium salt of styrene sulfonic acid and the disodium salt of maleic acid in a 3:1 mole ratio, (2) a hydrophobic copolymer of styrene, butyl methacrylate, butyl acrylate, and methacrylic acid, and (3) a polyfunctional aziridine; wherein said aziridine interlinks (1) and (2) to form said antistatic layer; and wherein (1) may range from 25 to 85, (2) from 15 to 75 and (3) from 2 to 40, on a weight ratio basis.

16. The process of preparing the product of claim 7, characterized in that components (1), (2), and (3) are applied to the film support in the form of an aqueous coating composition in which components (1) and (3) are dissolved and in which component (2) is either dissolved or is dispersed as a latex.

* * * * *